United States Patent
Halabian et al.

(10) Patent No.: US 11,122,448 B2
(45) Date of Patent: Sep. 14, 2021

(54) SYSTEM AND METHOD FOR SCALABLE RADIO RESOURCE MANAGEMENT FOR WIRELESS LOCAL AREA NETWORKS

(71) Applicant: Telefonaktiebolaget LM Ericsson (publ), Stockholm (SE)

(72) Inventors: Hassan Halabian, Ottawa (CA); Afshin Sahabi, Kanata (CA); Mike Skof, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/341,190

(22) PCT Filed: Oct. 20, 2017

(86) PCT No.: PCT/IB2017/056550
§ 371 (c)(1),
(2) Date: Apr. 11, 2019

(87) PCT Pub. No.: WO2018/073810
PCT Pub. Date: Apr. 26, 2018

(65) Prior Publication Data
US 2019/0320332 A1 Oct. 17, 2019

Related U.S. Application Data

(60) Provisional application No. 62/410,939, filed on Oct. 21, 2016.

(51) Int. Cl.
*H04W 24/02* (2009.01)
*H04W 16/18* (2009.01)
*H04W 84/12* (2009.01)

(52) U.S. Cl.
CPC .......... *H04W 24/02* (2013.01); *H04W 16/18* (2013.01); *H04W 84/12* (2013.01)

(58) Field of Classification Search
CPC ..... H04W 24/02; H04W 16/18; H04W 84/12; H04W 84/18
See application file for complete search history.

(56) References Cited

U.S. PATENT DOCUMENTS

2016/0198350 A1* 7/2016 Lou ...................... H04B 17/345
370/252
2017/0094535 A1 3/2017 Nuss et al.

FOREIGN PATENT DOCUMENTS

| CN | 102742347 A | * 10/2012 | ........... H04L 5/0053 |
| WO | WO 2006/052565 A2 | 5/2006 | |
| WO | WO 2014/176503 A1 | 10/2014 | |

OTHER PUBLICATIONS

International Search Report and Written Opinion of the International Searching Authority, PCT/IB2017/056550, dated Jan. 22, 2018, 10 pages.

(Continued)

*Primary Examiner* — Zhensheng Zhang
(74) *Attorney, Agent, or Firm* — Sage Patent Group (57) ABSTRACT

A method and node for providing scalable radio resource management, RRM, in a wireless local area network, WLAN, are provided. According to one aspect, a method in a self-organizing network, SON, manager node includes receiving radio frequency, RF, scan data from wireless access points, AP, creating network segments of limited sizes based on the RF scan data, and periodically executing an RRM optimization algorithm in an RRM time slot in each of successive RRM periods.

6 Claims, 6 Drawing Sheets

(56) References Cited

OTHER PUBLICATIONS

Krishnan R et al, Efficient clustering algorithms for self-organizing wireless sensor networks, Ad Hoc Networks, Elsevier, Amsterdam, NL, vol. 4, No. 1, Jan. 1, 2006, XP027982388, pp. 36-59.

\* cited by examiner

SYSTEM AND METHOD FOR SCALABLE RADIO RESOURCE MANAGEMENT FOR WIRELESS LOCAL AREA NETWORKS

This application is a 35 U.S.C. § 371 national stage application of PCT International Application No. PCT/IB 2017/056550 filed on Oct. 20, 2017, which in turn claims domestic priority to U.S. Provisional Patent Application No. 62/410,939, filed on Oct. 21, 2016 the disclosures and content of which are incorporated by reference herein in their entirety.

TECHNICAL FIELD

This disclosure relates to wireless communications, and in particular, to scalable radio resource management for wireless local area networks (WLAN).

BACKGROUND

Wireless Local area networks (WLAN) provide short range (Local) wireless access to the network users based on IEEE 802.11 standards. The IEEE 802.11 standard defines two modes of network access for WLAN clients namely, ad hoc and infrastructure modes. While in the ad hoc mode wireless stations connect to each other in a peer-to-peer fashion. While in the infrastructure mode, the wireless connectivity is provided by using wireless access points (AP). The infrastructure mode is the more appropriate mode for providing internet access to wireless user devices (non-AP stations). In this mode, the APs are responsible for distribution of Internet access to the wireless user devices. Most of the WLAN networks deployed by Internet providers are operating in the infrastructure mode. In some embodiments of this disclosure it is assumed that WLANs operate in the infrastructure mode.

A WLAN is composed of a set of Basic Service Sets (BSSs) which is defined as one AP with its associated clients, e.g. wireless user devices. Each BSS is known by a BSSID (BSS Identifier) which is the MAC address of the AP in the BSS. An Extended Service Set (ESS) is a set of connected BSSs. The APs in an ESS are connected through a common distribution system. Each ESS has an ID which is called SSID (Service Set Identifier). WLAN internet providers deploy their network by deploying the ESSs (BSSs) over a desired coverage area. For example, all the APs (BSSs) in a shopping center with the same SSID build the ESS for the shopping center. A service provider provides internet access to its clients through the deployed ESSs.

As stated above, WLANs are operating based on IEEE 802.11 standards and therefore they are referred to as 802.11 WLANs. The IEEE 802.11 standard defines the PHY (Physical) and MAC (Medium Access Control) specification for the WLAN stations (AP and wireless device users). The performance of the access from the AP to the clients is controlled by changing the PHY and MAC layer parameters and functionalities in the AP and also in the wireless device users. In one BSS, the AP is responsible for controlling and optimizing the PHY and MAC layer parameters. The AP can do this based on the local information from the BSS. Examples of MAC and PHY layer parameters and functionalities include operating channel, transmission power, rate adaptation, beacon rate and power, etc. While the MAC and PHY performance optimization can be distributed and done locally by each AP in each BSS, another strategy would be to perform the network optimization globally and centrally over all the BSSs.

The latter methodology provides a centralized network management framework for optimizing WLAN networks. Note that a centralized solution will result in a better network-wide performance optimization rather than the distributed method. This is because a centralized solution can take the correlation and impact of BSSs on each other into account for network optimization and therefore, will result in a better network resource allocation. To clarify this issue, consider for example the problem of channel allocation in WLAN networks. In a local channel selection scheme, each AP chooses an operating channel based on the RSSI (received signal strength identifier) on each channel. For instance, the AP chooses the channel with the least RSSI. In this local channel selection scheme, the AP does not have the RSSI observed by other APs and it only acts based on its local information. The selected channel by the AP might improve its BSS performance but it might also deteriorate the performance of the neighboring BSSs.

The channel changes in the neighboring BSSs can also affect the performance of this BSS. This behavior will not result in a global optimal channel allocation to the BSSs in an RF neighborhood. Local channel allocation might also result in channel changes caught in a loop. A better approach is to collect all required information over all BSSs and then, in a central node, select the best channel plan for the network. A centralized channel selection will consider the impact of all the BSSs on each other. In WLAN networks, transmissions of co-channel BSSs impact each other either by colliding or adding interference to the received signal. Furthermore, co-channel APs need to share the channel-time fairly. Considering all these effects, it is concluded that a central channel selection can provide a better and more robust channel plan for the network.

Recently Wi-Fi internet providers have shown their interest in developing Self-Organizing Network (SON) managers for controlling and optimizing their WLAN networks. A SON manager is responsible for optimizing the PHY and MAC layer parameters and network settings of the BSSs in a WLAN. The primary goal of a Wi-Fi manager node is to provide efficient and vendor agnostic Wi-Fi radio resource management services in the presence of a large and dynamically changing number of APs over various traffic conditions. A vendor agnostic Wi-Fi SON manager may run a number of Wi-Fi radio resource management (RRM) algorithms by reading some input parameters from the network and writing the output parameters (Wi-Fi RRM configuration settings) to the APs in the network. The inputs and outputs of these algorithms should be supported and available in all the APs in the WLAN network. The Wi-Fi RRM configuration settings include PHY layer parameters, e.g., power, channel, channel bandwidth, MIMO and MU-MIMO configuration, data rate, etc., and also MAC layer parameters, e.g., CSMA/CA settings, clear channel assessment threshold, throughput, load balancing, traffic scheduling, QoS parameters, security parameters, association and disassociation parameters, etc. A SON manager node might be placed in a cloud server to provide cloud-based SON service to the WLAN. A SON manager node not only provides RRM services but also can be used for performance monitoring and management purposes.

There are two main problems with the existing Wi-Fi RRM solutions:

1) They are not scalable to large number of APs (e.g., millions of APs); and

2) They are reactive solutions rather than being proactive.

This limits these approaches to work only over small networks (less than hundreds of APs).

Existing solutions for Wi-Fi SON manager nodes are mostly reactive solutions, i.e., the SON manager nodes react to the events in the network immediately after they occur. Such solutions observe the behavior of the network by collecting the required information regarding the state of the network in terms of RF surveys and also traffic load/throughput data and then react to the most recent state of the network by optimizing the WLAN PHY and MAC parameters and other RRM configuration settings. While reactive approaches can react even to very small changes in the network performance, there are some issues with the performance of such solutions:

- For large networks where the dynamics of the network are high, reactive RRM approaches might react too frequently. This will make too frequent RRM configuration changes which might result in service disruption and wireless device user dissatisfaction.
- Too many RRM configuration changes might not be feasible in large networks since it will impose huge signaling and controlling load onto the network.
- Reactive approaches impose huge processing and memory overhead to the SON manager node which runs the RRM optimization framework.
- Reactive approaches might introduce delay to the RRM signaling and controlling messages. Thus, after receiving these controlling messages from the SON manager to the APs, the network condition might have changed again and the new network changes will be ineffective. In other words, the RRM optimizer might not be able to track the dynamics of the network.
- Reactive approaches require constant monitoring of the network and reporting the network changes to the SON manger node constantly which again imposes huge monitoring signaling overhead to the network.
- Most of the current reactive solutions are not vendor agnostic.
- Most of the current reactive solutions rely on using Wi-Fi controller nodes.
- The optimization decisions in such solutions might be disruptive to customer methods.

The RRM signaling, monitoring and controlling loads can be adjusted based on the SON node processing, memory and interface capabilities (bandwidth). However, this comes with the cost of reducing the frequency of network monitoring or network optimization. In this case, the network optimizations are only based on the latest state of the network. In other words, these solutions might fail to follow the network changes especially for the networks with high dynamics of traffic and RF changes which is the case for large WLAN networks.

SUMMARY

Some embodiments advantageously provide a method and node for providing scalable radio resource management, RRM, in a wireless local area network, WLAN. According to one aspect, a method in a self-organizing network, SON, manager node includes receiving radio frequency, RF, scan data from wireless access points, AP, creating network segments of limited sizes based on the RF scan data, and periodically executing an RRM optimization algorithm in an RRM time slot in each of successive RRM periods.

According to this aspect, in some embodiments, sizes of the network segments are less than a predetermined threshold. In some embodiments, the predetermined threshold is based on a number of APs over which to execute the RRM optimization algorithm. In some embodiments, the predetermined threshold is based on an amount of time between successive RRM time slots. In some embodiments, the SON manager node is cloud server. In some embodiments, the cloud server interfaces with a configuration interface configured to transmit operating parameters to APs, and a data interface configured to receive the RF scan data from the APs.

According to another aspect, a self-organizing network, SON, manager node configured to provide scalable radio resource management, RRM, in a wireless local area network, WLAN, is provided. The node includes processing circuitry including a memory and a processor. The memory is configured to store RF scan data. The processor is configured to receive radio frequency, RF, scan data from wireless access points, AP, create network segments of limited sizes based on the RF scan data, schedule periodic execution of an RRM optimization algorithm in RRM time slots in successive RRM periods, and execute the RRM optimization algorithm during a scheduled RRM time slot in each of successive RRM periods.

According to this aspect, in some embodiments, sizes of the network segments are less than a predetermined threshold. In some embodiments, the predetermined threshold is based on an amount of time between successive RRM time slots. In some embodiments, the SON manager node is a cloud server. In some embodiments, the SON manager node further includes a configuration interface configured to transmit operating parameters to APs, and a data interface configured to receive the RF scan data from the APs.

According to yet another aspect, a SON, manager node configured to provide scalable radio resource management, RRM, in a wireless local area network, WLAN. The node includes a data collector module configured to receive radio frequency, RF, scan data from wireless access points, AP, a network slicer module configured to create network segments of limited sizes based on the RF scan data, an RRM scheduler module configured to schedule periodic execution of an RRM optimization algorithm in RRM time slots in successive RRM periods, and an RRM optimizer module configured to execute the RRM optimization algorithm during a scheduled RRM time slot.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to scalable radio resource management for wireless local area networks (WLAN). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments provide a vendor agnostic scalable RRM solution. The solution is scalable to support tens of millions of APs. In contrast to reactive RRM algorithms for Wi-Fi SON manger nodes, embodiments described herein use proactive RRM optimization algorithms which operate based on predictive and learning principles, although the architecture is broad enough to cover both reactive and pro-active algorithms. In one implementation of the SON architecture, RF survey data from each AP is used as well as the network load data.

To be scalable to tens of millions of APs, a modular architecture for the SON manager is. In the modular architecture, a network slicer algorithm first performs network clustering and segmentation based upon the RF scan data collected by the SON manager node. RF scan data are the RF scan reports created by the APs in which using an active or passive channel scan, the APs identify the neighboring APs on all the channels. The slicer algorithm uses these scan reports and creates network segments of limited sizes. The segments are formed such that they have minimum RF impact (interference) on each other. The segment sizes are all less than a maximum threshold which marks the ultimate size of the number of APs over which to run the RRM optimization algorithms in a timely manner, i.e., having the RRM results ready before the next RRM scheduled time. A goal of the slicer algorithm is to keep updating the AP segments and clusters such that RRM optimizations can run over each segment separately and independently.

In one embodiment, the RRM algorithms run over each segment at scheduled times. The RRM scheduling times are determined by the scheduler algorithm. The granularity of the RRM optimization actions is defined as RRM time-slot. In other words, an RRM time-slot is the minimum time difference of two consecutive RRM optimizations. For example, if the RRM optimization is performed hourly the time-slot is defined to be one hour. The solution described herein is independent of the RRM algorithms used in the optimizer. In other words, any proactive or reactive RRM optimization can be used in the RRM optimizer although pro-active approaches may be better suited due to the predictive nature of these algorithms as well as their scalability. The RRM Optimizer is input with a variety of network parameters and statistics collected from the network including the RF scan reports from the AP, AP load values as well as air time utilization statistics, etc. The input to the RRM optimizer however is not limited to the aforementioned parameters and metrics. Basically any network observable parameter and statistics can be used as an input to the RRM optimizer.

In one implementation, predicted traffic load values as well as latest RF scan reports are used for channel assignment over the APs of the network. For traffic and network load (demand) data, a predictive approach is used in which the collected network load information for each time-slot is collected and smoothed and then based on the predicted network load for the same time-slot for the next RRM period. By having the latest RF survey data as well as the predicted traffic load, one can perform the RRM optimization algorithms for each RRM time-slot. Note that by performing the predictive RRM one has a proactive RRM solution. In other words, at the same time the RRM RF survey is collected, optimal RRM configuration settings up to the next RF survey time are obtained. Notice that RF scan data is used by the network slicer as well as the RRM optimization algorithms.

As mentioned above, the SON solution also incorporates a scheduler which schedules the RRM optimization tasks. The scheduler may be used to control the efficiency and improve the effectiveness of the RRM solution. Slicer algorithms as well as the scheduler and optimization multi-threading will result in a scalable RRM solution.

The predictive RRM solutions discussed herein have at least some of the following advantages.

Operates based on network learning principles and optimizes the network by using the latest RF survey data as well as network performance statistics collected from the network.

It is truly vendor agnostic.

Can be easily deployed in a cloud server.

It is horizontally scalable (tens of millions of APs).

Low signaling and controlling overhead.

Modular and scalable architecture.

Flexible for different network venues and traffic conditions.

A scalable predictive RRM Wi-Fi SON manager and the system architecture to achieve vendor agnostic RRM is presented. The scalability of the solution comes from the modular design of the solution including a network slicer, predictive RRM optimizer and scheduler.

The RRM solution follows a modular and scalable architecture which includes the following building blocks:

Network slicer
Data collector
RRM scheduler
RRM optimizer

Figure 1:
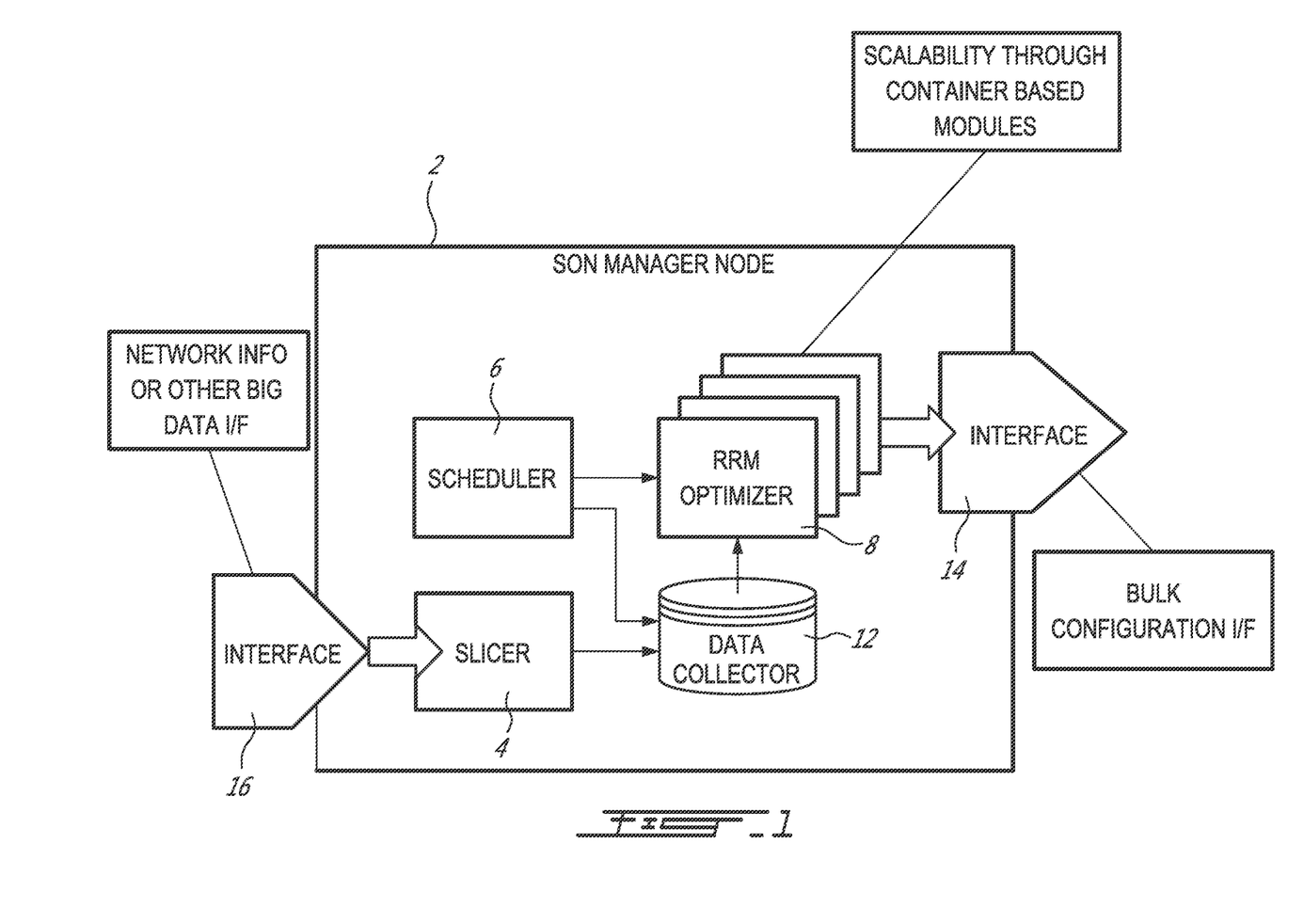
FIG. 1 is a block diagram of a SON manager node.

FIG. 1 shows a Wi-Fi SON 2 manager architecture and its building components. The network slicer 4 is responsible for clustering and segmenting the network into smaller clusters and segments. Each segment may contain a limited number of BSSs under control. The RRM optimizer 8 then optimizes the RRM configuration settings (e.g., tx power or operating channel) per network segment. Segmentation is done such that different segments have minimum RF impact on each other. The slicer 4 is the main component of the Wi-Fi SON solution that provides scalability up to the level of tens of millions of APs. The slicer functions to slice the controlled Wi-Fi network into multiple segments that are manageable by the RRM optimizer.

The algorithm is designed to maintain segment relevancy to RRM objectives. In this regard, based on the RRM optimization and capabilities of the RRM optimizer 8, the maximum segment size is determined. This value is the largest size of a segment that can be handled by an RRM optimization thread. This is an input parameter that can be configured using either a configuration file or command line interface (CLI).

The slicing function may only rely on the background channel scan (BCS) reports coming from the APs. A BCS report contains the neighbor list and the associated RSSI values to each of the neighbors of an AP as well as their operating channel. An AP can get this information by passively scanning all the possible channels and listening to the beacon frames coming from the other neighboring APs. Another possibility is to scan the channel actively by sending probe frames.

The data collector 12 is responsible for collecting and smoothing the network statistics, traffic and network load data from the network for each segment and for each RRM time-slot, as well as collecting the RF survey data from each AP.

An RRM time-slot is defined as the granularity of the RRM optimization. For example, if the RRM performs hourly optimizations, the time-slot is defined to be one hour. Example notions of RRM period and RRM time slot are presented in FIG. 2. RRM periods are the period of time over which the network behavior is assumed to be periodic in terms of traffic load and pattern. The RRM time slots are the times over which an RRM optimization can be run. It is the finest time granularity over which one may optimize the network. In general, other network parameters and statistics can be collected from the APs and smoothed using appropriate low pass filters and kept in the data collector. This network information may then be used by the RRM optimizer 8 to run the RRM optimization algorithm and determine the optimal RRM configurations.

The RRM optimizer 8 is composed of a set of RRM algorithms whose goal is to perform RRM optimizations for different RRM configuration parameters. While the RRM optimizer is not limited to the type of the invoked optimization algorithms, using pro-active algorithms in the RRM optimizer 8 will provide a more scalable Wi-Fi SON solution.

The notion of predictive and proactive RRM comes from the idea of having periodic traffic load on the APs of a WLAN. Therefore, RRM periods are defined in the network and it is believed that the traffic pattern (e.g., volume, type and distribution) is highly correlated over different RRM periods. For example, in an office building employees come to work every 8 am and go for lunch between 12 pm-1 pm and leave the office around 5 pm. This pattern is repeated every day and thus the RRM period may be defined as one day. The RRM period can, however, be defined as a week since the traffic pattern is different on weekdays and weekends.

Figure 2:
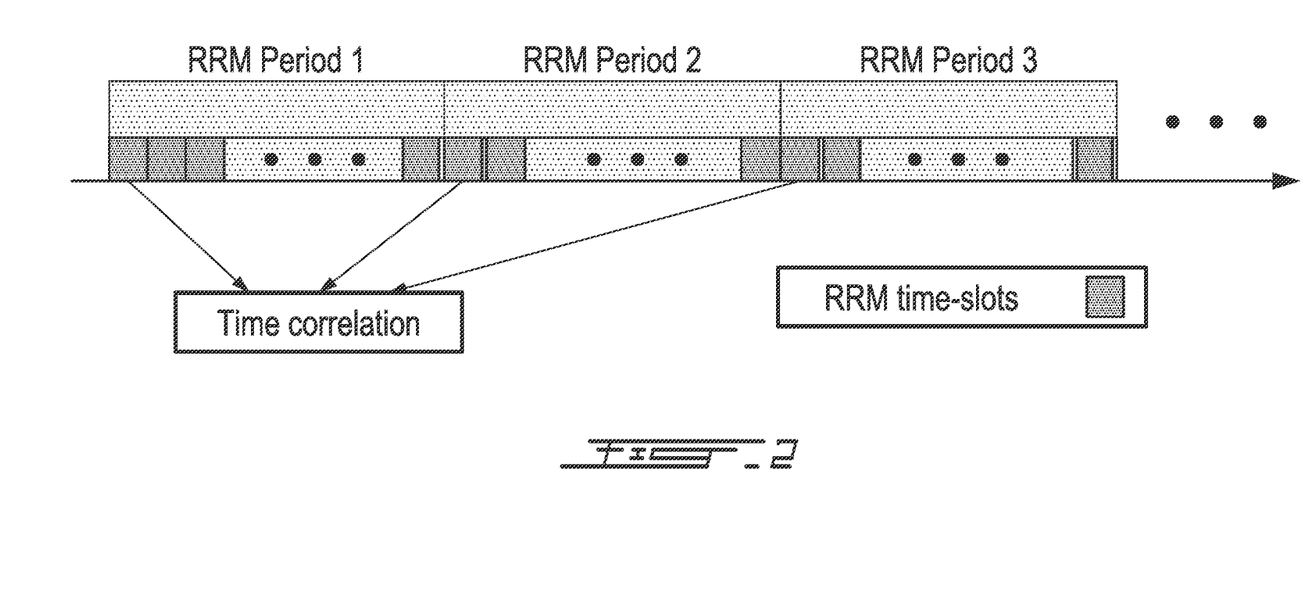
FIG. 2 is a timing diagram showing RRM periods and time slots.

As observed in FIG. 2, during each RRM period the RRM time-slots are defined which determine the time granularity of performing RRM optimizations. Time-slots are defined based on the processing capability of the RRM optimizer 8 as well as the bandwidth of the SON manager interfaces, system delay requirements and also traffic coherence time which is the duration of the time over which the traffic is assumed be correlated (does not have drastic changes). Note that choosing the time-slot duration may be based on a trade-off among the above mentioned factors. An example of the RRM period is one week, i.e., it is assumed that the traffic pattern is periodic with the period of one week. An example of a time-slot is one hour, i.e. RRM is performed hourly. In this example it is assumed that the traffic patterns over every hour of the same day of the week over different weeks are correlated. FIG. 2 illustrates RRM period, RRM time-slot and correlation among the time-slots.

The RRM scheduler 6 is responsible for scheduling the RRM optimization performed by the RRM optimizer. The RRM scheduler 6 may control the efficiency of the whole RRM solution by avoiding performing unnecessary RRM optimization (which imposes processing overhead) and also by limiting the number of changes per AP. Too frequent RRM changes on one AP is not favorable since this might result in outage as well as wireless device user service disruption.

The scheduler 6 is another unit that provides scalability in the SON manager node architecture. A function of the scheduler 6 is to select a subset of the RRM time slots among all the available RRM time slots. In one embodiment, the scheduler 6 performs RRM scheduling based upon the cost values available from the previous RRM periods. It picks the time slots which were costlier in the previous RRM periods. This is done by defining a cost function over the network. In another embodiment, the scheduling decisions are made based on the recent RF scan results as well as the predicted load values.

The Wi-Fi SON architecture includes two main interfaces:
Network data or other big data interface 16: The SON manager collects network data from the network (APs) which are required to run RRM optimization algorithms. This includes without limitation RF scan reports from the APs, traffic load statistics, channel utilization statistics, AP static configuration parameters, etc. As used herein, "big data" refers to large data sets that may be analyzed computationally to reveal patterns, trends, and associations. As such, big data interface 16 refers to an interface used to collect large data sets over a predetermined size threshold where the threshold is not fixed and depends upon the particular implementation and design needs.
Bulk configuration interface 14: After running optimization algorithms the optimal RRM configuration parameters need to be sent to the APs so that the APs can updates their parameters. The SON manager sends the bulk RRM configuration parameters using this interface.

These two interfaces can be connected to a mediation layer which stores the network data and the RRM configuration parameters to be used by the network APs.

Figure 3:
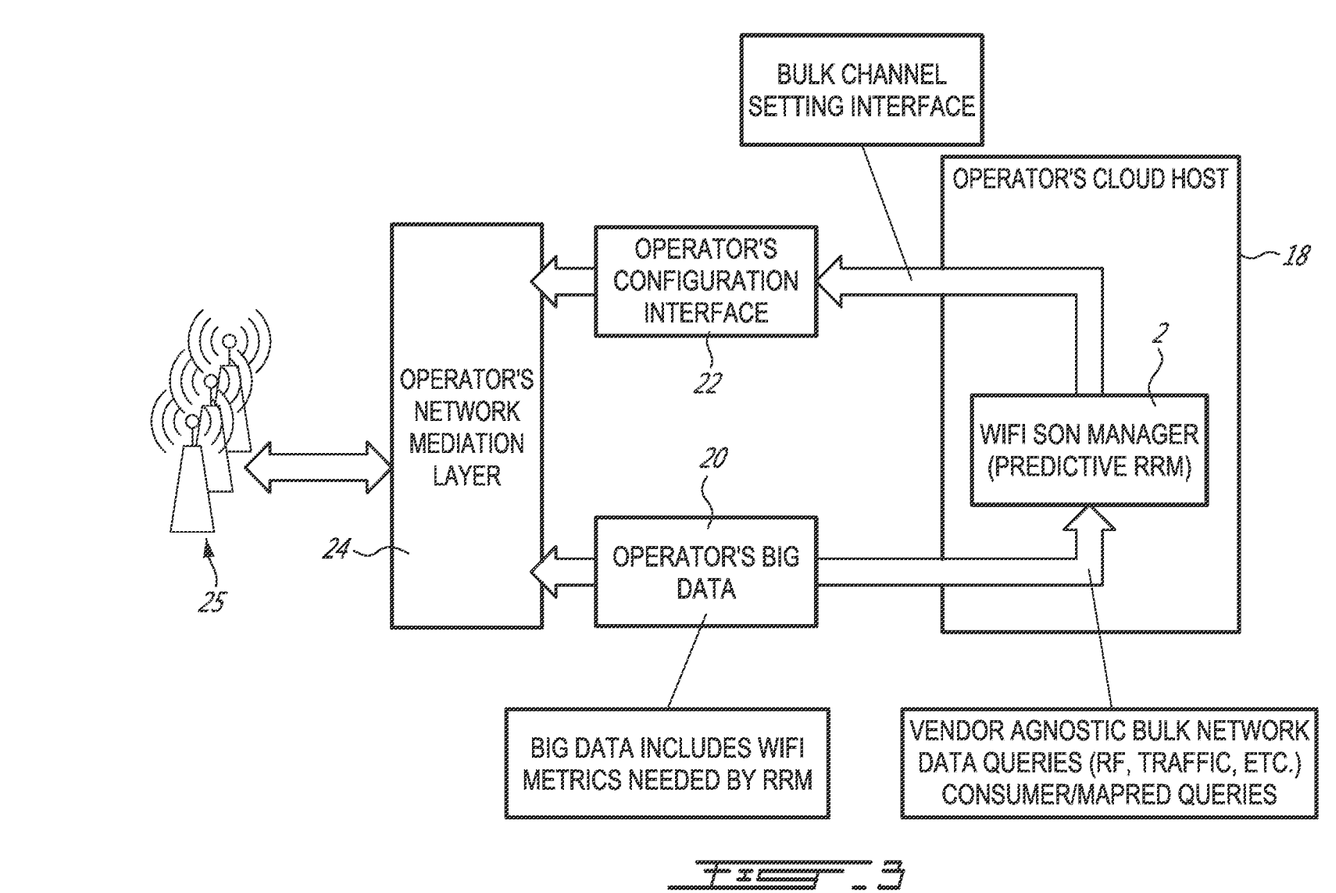
FIG. 3 is a system diagram with a SON manager node located in an operator's cloud.

Implementation of the predictive RRM solution in a "cloud" server embodiment is described with reference to FIG. 3. In this embodiment, the Wi-Fi SON manager 2 is installed in a cloud server 18 which obtains RF survey and traffic load data from a big-data server 20. The big-data server 20 uses the operator mediation layer 24 to collect the RF survey as well as the traffic load data from the operator's network. The Wi-Fi SON manager writes the RRM configuration parameters into the operator configuration interface 22 whose responsibility is to change the RRM configuration setting of the APs in the operator's network. Note that it is contemplated that the functions and processes described herein can be distributed over several physical nodes and/or devices. For example, the functionality of SON manager 2 can be distributed among multiple physical nodes and is not limited to implementation in a single physical node or cloud server device.

In another embodiment, the entire Wi-Fi SON manager 2 can be defined as a hosted Wi-Fi SON manager node which provides RRM services for the APs of different networks. In this implementation, the RRM service is sold to the operators. This means all the maintenance, support and upgrades are performed by the RRM service provider, not the mobile operator. The benefit of this implementation is that more managed APs will be optimized together, i.e., the effect of unmanaged nodes on the performance of managed ones will be minimized and more APs can get the benefit of RRM service. Moreover, upgrade, maintenance and support is provided locally within a single SON manager instead of having multiple SON managers with different architectures and objectives and requirements whose operations are not coordinated and sometimes contradict. Finally, such an implementation provides a more efficient RRM service as network function virtualization techniques can provide much more efficient implementation of the SON service in terms of hardware, storage and processing.

Thus, a predictive based RRM solution for radio resource management in Wi-Fi networks is provided. The structural architecture described herein may include the data collector 12, RRM optimizer 8, network slicer 4 and RRM scheduler 6. The notions of RRM period and RRM time-slot in the context of predictive RRM are useful to describe the architecture. Some embodiments include a cloud based implementation of the solution.

Figure 4:
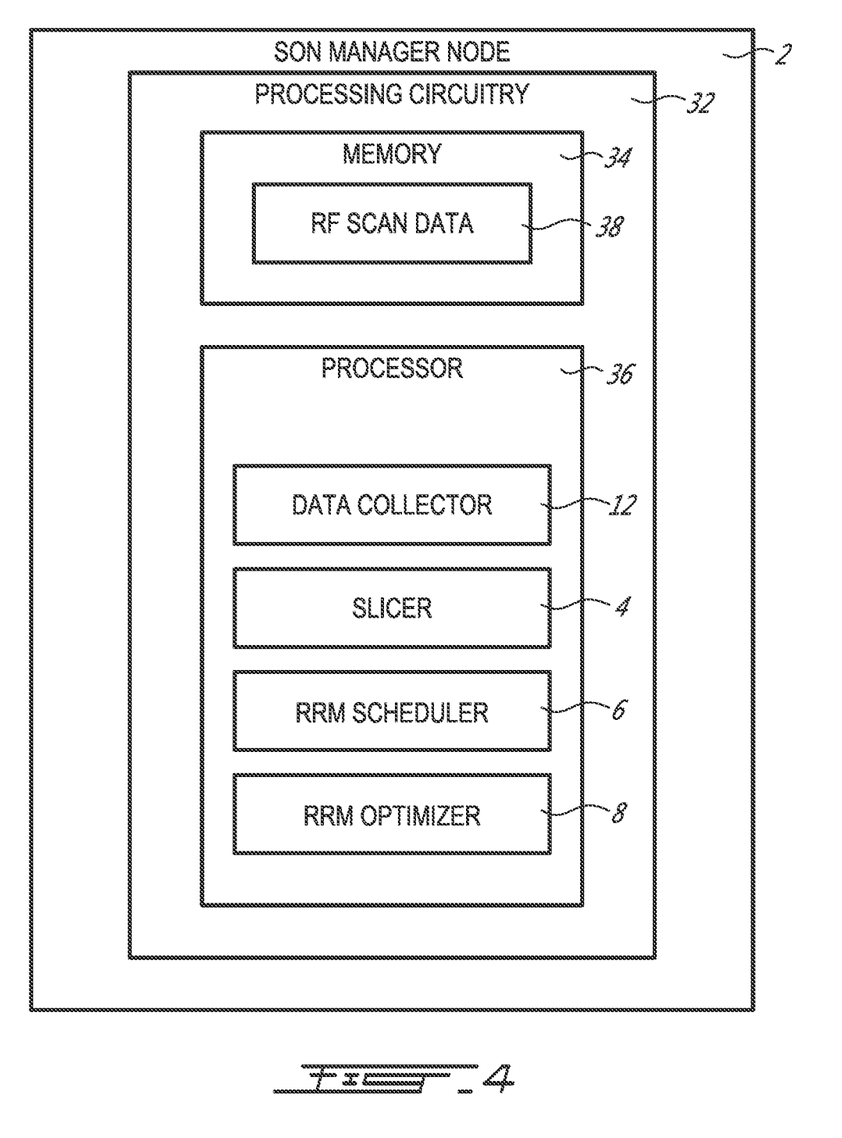
FIG. 4 is a block diagram of a SON manager node.

FIG. 4 is a block diagram of a SON manager node 2, having processing circuitry 32. In some embodiments, the processing circuitry 32 may include a memory 34 and a processor 36, the memory 34 containing instructions which, when executed by the processor 36, configure processor 36 to perform the one or more functions described herein with respect to data collector 12, RRM optimizer 8, network slicer 4 and RRM scheduler 6. In addition to a traditional processor and memory, processing circuitry 32 may comprise integrated circuitry for processing and/or control, e.g., one or more processors and/or processor cores and/or FPGAs (Field Programmable Gate Array) and/or ASICs (Application Specific Integrated Circuitry).

Processing circuitry 32 may comprise and/or be connected to and/or be configured for accessing (e.g., writing to and/or reading from) memory 34, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be configured to store code executable by control circuitry and/or other data, e.g., data pertaining to communication, e.g., configuration and/or address data of nodes, etc. Processing circuitry 32 may be configured to control any of the methods described herein and/or to cause such methods to be performed, e.g., by processor 36. Corresponding instructions may be stored in the memory 34, which may be readable and/or readably connected to the processing circuitry 32. In other words, processing circuitry 32 may include a controller, which may comprise a microprocessor and/or microcontroller and/or FPGA (Field-Programmable Gate Array) device and/or ASIC (Application Specific Integrated Circuit) device. It may be considered that processing circuitry 32 includes or may be connected or connectable to memory, which may be configured to be accessible for reading and/or writing by the controller and/or processing circuitry 32.

The memory 34 is configured to store radio frequency (RF) scan data used by the processor 36 to create network segments. In one embodiment, the processor 36 executes software to perform scalable RRM functionality. The processor 36 receives RF scan data from wireless access points APs via a data collector 12. As discussed above, the network segment slicer 4 creates network segments of limited sizes based on the RF scan data and the RRM scheduler 6 schedules periodic running of an RRM optimization algorithm in RRM time slots in successive RRM periods. The RRM optimizer 8 executes the RRM optimization algorithm during a scheduled RRM time slot.

In some embodiments, the sizes of the network segments are less than a predetermined threshold. In some embodiments, the predetermined threshold is based on a number of APs over which to run the RRM optimization algorithm. In some embodiments, the predetermined threshold is based on an amount of time between successive RRM time slots. In some embodiments, the SON manager node 2 is in a cloud hosted by an operator. In some embodiments, the SON manager node 2 further includes a configuration interface configured to transmit operating parameters to APs, and a big data interface configured to receive the RF scan data from the APs.

Figure 5:
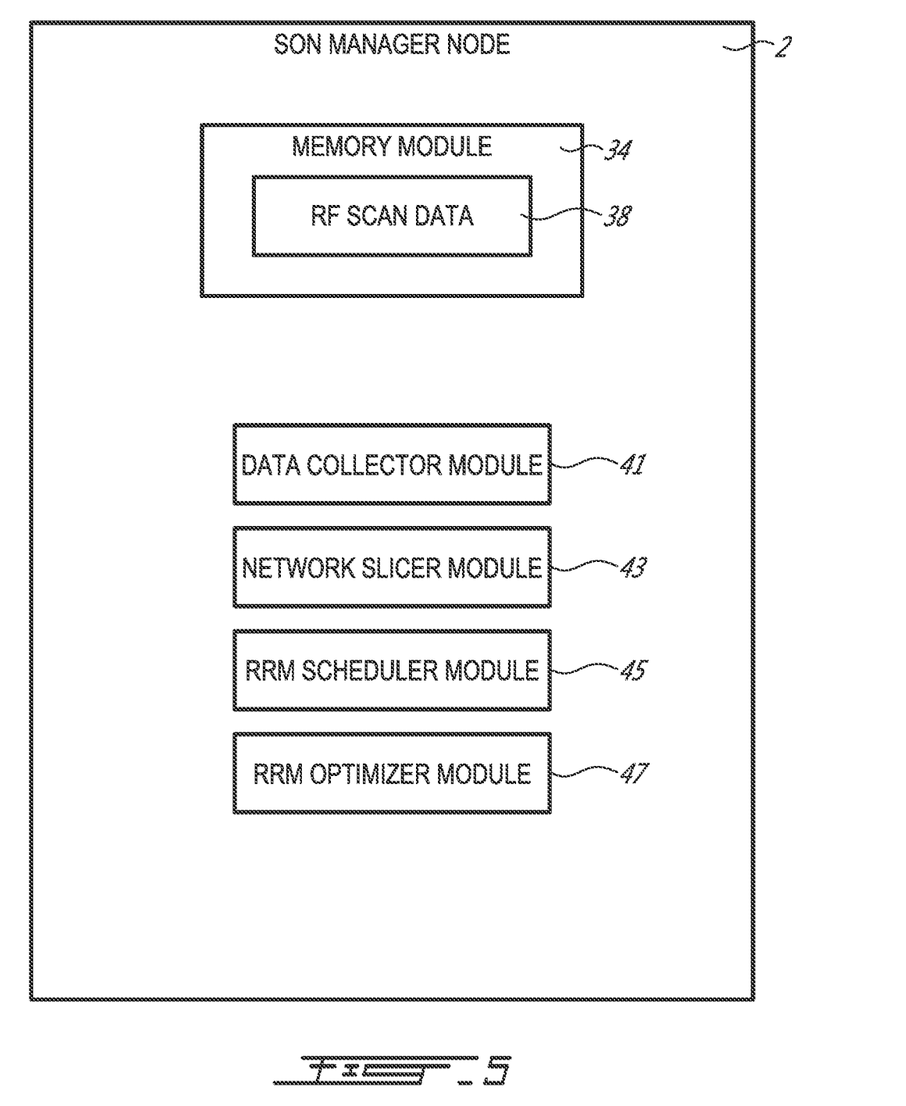
FIG. 5 is a block diagram of an alternative embodiment of a SON manager node.

FIG. 5 is a block diagram of an alternative embodiment of a SON manager node 2 having a memory module 34 which stores RF scan data 48 and further includes software modules that when executed by a processor perform the functions of the SON manager node 2. The data collector module 41 is configured to receive radio frequency, RF, scan data from wireless access points, AP. The network slicer module 43 is configured to create network segments of limited sizes based on the RF scan data. The RRM scheduler module 45 is configured to schedule periodic running of an RRM optimization algorithm in RRM time slots in successive RRM periods. The RRM optimizer module 47 is configured to execute the RRM optimization algorithm during a scheduled RRM time slot.

Figure 6:
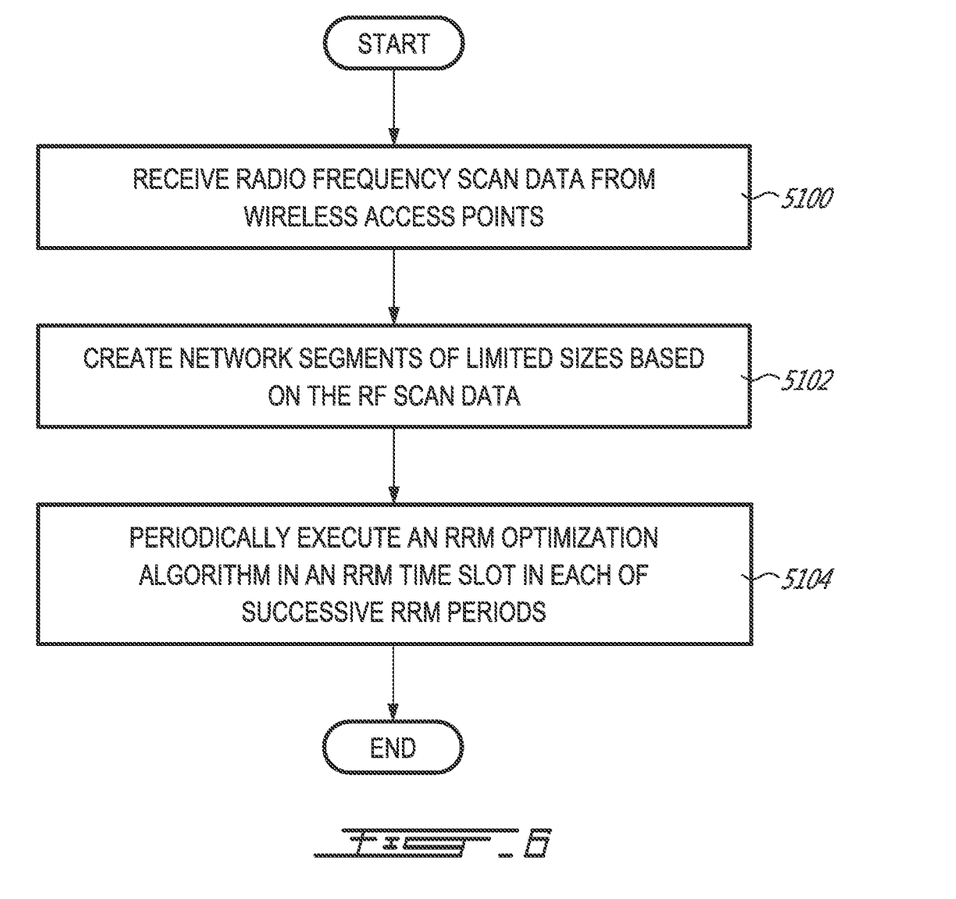
FIG. 6 is a flowchart of an exemplary process for providing scalable RRM in a WLAN.

FIG. 6 is a flowchart of an exemplary process in a SON manager node 2 of providing scalable RRM in a WLAN. The process includes receiving radio frequency, RF, scan data from wireless access points, AP 25 (block S100). The process includes creating network segments of limited sizes based on the RF scan data (block S102). The process further includes running an RRM optimizer algorithm periodically in an RRM time slot in each of successive RRM periods (block S104).

| Abbreviation | Explanation |
| --- | --- |
| AP | Access Point |
| CSMA/CA | Carrier Sensing Multiple Access/Collision Avoidance |
| DL | Downlink |
| MAC | Medium Access Control |
| PHY | Physical layer |
| STA | IEEE 802.11 station |
| UL | Uplink |
| WLAN | Wireless Local Area Network |
| RRM | Radio Resource Management |
| SON | Self-Organizing Network |
| ACC | AP Channel Capacity |
| KPI | Key Performance Indicator |
| Tx | Transmit |
| Rx | Receive |
| BSS | Basic Service Set |
| RF | Radio Frequency |
| RSSI | Received Signal Strength Identifier |

Some embodiments include:

Embodiment 1

A method in a self-organizing network, SON, manager node of providing scalable radio resource management, RRM, in a wireless local area network, WLAN, the method comprising:

receiving radio frequency, RF, scan data from wireless access points, AP;

creating network segments of limited sizes based on the RF scan data; and periodically executing an RRM optimization algorithm in an RRM time slot in each of successive RRM periods.

Embodiment 2

The method of Embodiment 1, wherein sizes of the network segments are less than a predetermined threshold.

Embodiment 3

The method of Embodiment 2, wherein the predetermined threshold is based on a number of APs over which to execute the RRM optimization algorithm.

Embodiment 4

The method of Embodiment 3, wherein the predetermined threshold is based on an amount of time between successive RRM time slots.

Embodiment 5

The method of Embodiment 1, wherein the SON manager node is a cloud server.

Embodiment 6

The method of Embodiment 5, wherein the cloud server interfaces with:
a configuration interface configured to transmit operating parameters to APs; and
a data interface configured to receive the RF scan data from the APs.

Embodiment 7

A self-organizing network, SON, manager node configured to provide scalable radio resource management, RRM, in a wireless local area network, WLAN, the node comprising:
processing circuitry including a memory and a processor:
the memory configured to store RF scan data;
the processor configured to:
 receive radio frequency, RF, scan data from wireless access points, AP;
 create network segments of limited sizes based on the RF scan data;
 schedule periodic execution of an RRM optimization algorithm in RRM time slots in successive RRM periods; and
 periodically execute the RRM optimization algorithm during a scheduled RRM time slot in each of successive RRM periods.

Embodiment 8

The node of Embodiment 7, wherein sizes of the network segments are less than a predetermined threshold.

Embodiment 9

The node of Embodiment 8, wherein the predetermined threshold is based on a number of APs over which to run the RRM optimization algorithm.

Embodiment 10

The node of Embodiment 9, wherein the predetermined threshold is based on an amount of time between successive RRM time slots.

Embodiment 11

The node of Embodiment 1, wherein the SON manager node is a cloud server.

Embodiment 12

The node of Embodiment 11, further including:
a configuration interface configured to transmit operating parameters to APs; and
a data interface configured to receive the RF scan data from the APs.

Embodiment 13

A self-organizing network, SON, manager node configured to provide scalable radio resource management, RRM, in a wireless local area network, WLAN, the node comprising:
a data collector module configured to receive radio frequency, RF, scan data from wireless access points, AP;
a network slicer module configured to create network segments of limited sizes based on the RF scan data;
an RRM scheduler module configured to schedule periodic execution of an RRM optimization algorithm in RRM time slots in successive RRM periods; and
an RRM optimizer module configured to execute the RRM optimization algorithm during a scheduled RRM time slot.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, some embodiments of the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of some embodiments of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings which are limited only by the following claims.

What is claimed is:

1. A method in a self-organizing network, SON, manager node of providing scalable radio resource management, RRM, in a wireless local area network, WLAN, the method comprising:
   receiving radio frequency (RF) scan data and predicted network load values, from each of wireless access points (APs), wherein the predicted network load values are determined based on collection of network load information from the APs for each RRM time slot associated with an RRM period, and prediction of network values for the same RRM time slot for a next RRM period, and wherein each RRM time slot associated with each RRM period is defined as time over which an RRM optimization algorithm can be executed;
   creating network segments of limited sizes based on the RF scan data associated with each AP,
   wherein sizes of the network segments are less than a predetermined threshold, and
   wherein the predetermined threshold is based on a number of APs over which to execute the RRM optimization algorithm and an amount of time between successive RRM time slots;
   scheduling, based on the received RF scan data and the predicted network load values, periodic execution of the RRM optimization algorithm in RRM time slots in successive RRM periods; and
   periodically executing the RRM optimization algorithm over each of the network segments during the scheduled RRM time slot in each of the successive RRM periods.

2. The method of claim 1, wherein the SON manager node is a cloud server.

3. The method of claim 2, wherein the cloud server interfaces with:
   a configuration interface configured to transmit operating parameters to APs; and
   a data interface configured to receive the RF scan data from the APs.

4. A self-organizing network, SON, manager node configured to provide scalable radio resource management, RRM, in a wireless local area network, WLAN, the node comprising:
   processing circuitry configured to:
   store RF scan data;
   receive radio frequency (RF) scan data and predicted network load values, from each of wireless access points (APs), wherein the predicted network load values are determined based on collection of network load information from the APs for each RRM time slot associated with an RRM period, and prediction of network values for the same RRM time slot for a next RRM period, and wherein each RRM time slot associated with each RRM period is defined as time over which an RRM optimization algorithm can be executed;
   create network segments of limited sizes based on the RF scan data associated with each AP,
   wherein sizes of the network segments are less than a predetermined threshold, and
   wherein the predetermined threshold is based on a number of APs over which to run the RRM optimization algorithm and an amount of time between successive RRM time slots;
   schedule, based on the received RF scan data and the predicted network load values, periodic execution of the RRM optimization algorithm in RRM time slots in successive RRM periods; and
   periodically execute the RRM optimization algorithm over each of the network segments during the scheduled RRM time slot in each of the successive RRM periods.

5. The node of claim 4, wherein the SON manager node is a cloud server.

6. The node of claim 5, further including:
   a configuration interface configured to transmit operating parameters to APs; and a data interface configured to receive the RF scan data from the APs.

\* \* \* \* \*